United States Patent
Raznov

[15] 3,685,360
[45] Aug. 22, 1972

[54] ADJUSTMENT MECHANISM FOR CABIN ALTIMETER ROTATABLE LIGHT HEAD

[72] Inventor: Jerry L. Raznov, Philadelphia, Pa.
[73] Assignee: Ametek, Inc., New York, N.Y.
[22] Filed: Aug. 28, 1970
[21] Appl. No.: 67,793

[52] U.S. Cl. .................................................73/387
[51] Int. Cl. ...............................................G01l 7/12
[58] Field of Search .........73/387, 384, 386; 116/129

[56] References Cited

UNITED STATES PATENTS

| | | | |
|---|---|---|---|
| 1,952,037 | 3/1934 | Cordero et al. | 73/387 |
| 2,362,393 | 11/1944 | Naida | 73/387 |

*Primary Examiner*—Donald O. Woodiel
*Attorney*—Smythe & Moore

[57] ABSTRACT

A dual transilluminated cabin altimeter and differential pressure indicator is provided with an altimeter dial which is rotatably mounted with respect to a fixed reference "bug" in order to compensate for variations in local air density. The movable dial is provided with a ring gear around its peripheral edge engageable by one of two pinion gears mounted on the ends of a yoke carried on a pivotally mounted shaft of a compensating knob assembly. The shaft extends outwardly of the casing and carries a compensating knob which when actuated will pivot the shaft to cause one of the gears to engage the gearing on the movable dial to position this dial with respect to the fixed reference "bug" or reference mark.

4 Claims, 5 Drawing Figures

PATENTED AUG 22 1972

INVENTOR
JERRY L. RAZNOV
BY
Smythe & Moore
ATTORNEYS

PATENTED AUG 22 1972 3,685,360

INVENTOR
JERRY L. RAZNOV
BY
Smythe & Moor
ATTORNEYS

ADJUSTMENT MECHANISM FOR CABIN ALTIMETER ROTATABLE LIGHT HEAD

Conventional cabin pressure altimeters and combination cabin pressure altimeters and differential pressure indicators, lighted or unlighted, used in aircraft do not normally provide an accurate indication of the cabin altitude of the aircraft above ground level even though such devices are calibrated against the United States standard atmosphere tables of air pressure verses altitude. Because air pressure at low altitudes varies with respect to local barometric conditions, such instruments provide inaccurate outputs unless they can be corrected for these variations. This built-in error in altitude readings in such cabin pressure altimeters is not desirable in many situations including indication of true altitude above ground level when landing pressurized aircraft.

Sensitive altimeters have been constructed which can be compensated for variations in pressure altitude and many arrangements have been devised by which it is possible for the pilot to zero shift the instrument for adjusted sea level standard conditions. The pilot merely changes the instrument reference of 29.92 of Hg =0 feet to the localized pressure altitude for zero feet which is readily obtained from the control tower where he is to land. This correction zero adjusts the sensitive altimeter in such a manner that when the plane has landed, the altimeter will indicate the true airport elevation. While many forms of compensating or adjusting assemblies have been designed for sensitive altimeters, such devices have never been offered on dual, transilluminated (i.e., back lighted), cabin pressure altimeters and differential pressure indicators.

One of the objects of this invention is to provide a dual transilluminated cabin altimeter and differential pressure indicator with barometric compensation.

Another of the objects of the invention is to provide an adjustment mechanism that will allow total operation of the instrument after the outer case containing the adjustment mechanism is removed.

Another object of the invention is to permit disassembly and assembly of the case containing the adjustment mechanism from the instrument without using special tools, alignment fixtures, positioning of delicate cables and complicated engagements of gears and linkages.

Another of the objects of the invention is to provide a positive mechanical adjustment mechanism that is independent of friction driving means.

Another of the objects of the invention is to provide a gear train in which a pinion is affixed to one sub-assembly, the gear to a second sub-assembly, and the center distance between gear and pinion can float. The center distance is neither defined nor fixed.

Another of the objects of the invention is to apply compensation to the cabin altitude portion of the instrument without affecting the operation or accuracy of the differential pressure portion.

Another object of the invention is to provide high quality back lighting, with uniformity of color temperature, without visible stray light and with a rotatable back lighted dial.

Another of the objects of the present invention is to provide a compensating knob assembly for barometric cabin pressure altimeters which is simple and effective in construction and operation and which does not require accurate location relative to the center of the movement.

According to one aspect of the present invention, an instrument for indicating true cabin altitude and differential pressure may be provided with a first indicator dial mounted within a casing. A second indicator dial is rotatably mounted on the first dial and has gearing around its periphery. A compensating knob assembly is carried by the casing and includes a shaft positioned adjacent the second dial periphery and extending outwardly of the casing with a knob being mounted on the shaft extended portion. Within the casing, the shaft carries gear means adjacent the peripheral gearing of the second dial with the gear means being engageable with the second dial gear when the compensating knob is actuated so that the second dial can be adjusted with respect to the first dial upon actuation of the compensating knob. The first dial may be fixedly mounted within the casing and may be provided with two scales indicating respectively barometric pressure and altitude. The second dial may be annular and mounted around a peripheral edge of the first dial. The second dial may carry a scale indicating differential pressure and a fixed reference "bug" or indicia.

Other objects, advantages and features of the present invention will become apparent from the accompanying description and drawings, which are merely exemplary.

In the drawing.

Proceeding next to the drawings wherein like reference symbols indicate the same parts throughout the various views, a specific embodiment of the present invention will be described in detail.

Figure 1:
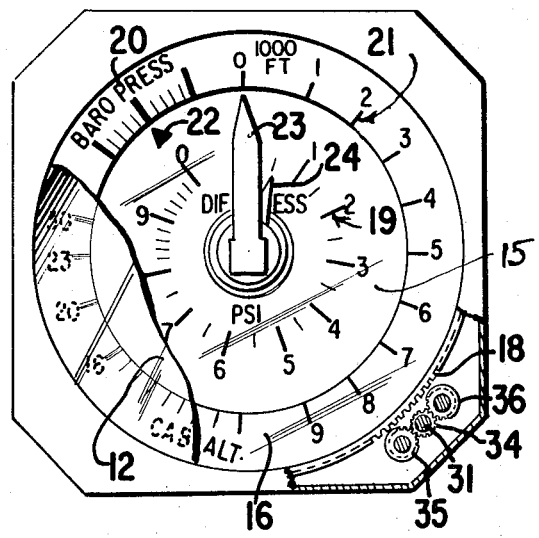
Fig. 1 is a front elevation view of an instrument incorporating the present invention with a portion of the front wall and indicating dial being cut away to show a part of the compensating knob assembly.
Figure 3:
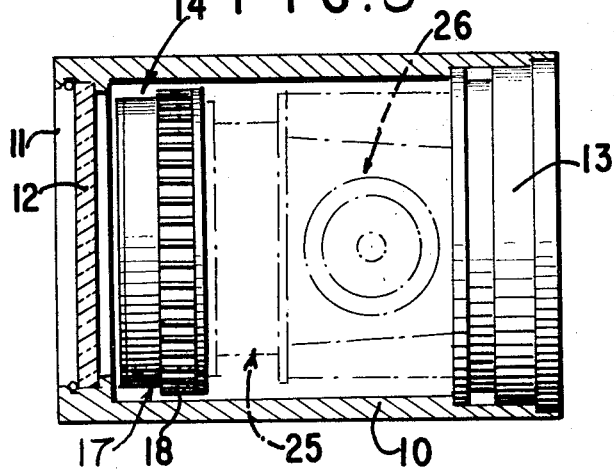
FIG. 3 is a longitudinal sectional view of the instrument and casing shown in FIG. 1.

As may be seen in FIGS. 1 and 3, the barometric altimeter comprises a casing 10 having an open front portion 11 closed by a transparent viewing window 12 and a rear wall 13.

A light head assembly indicated generally at 14 is located in the casing. The head comprises differential pressure dial 15 mounted on the end of the head and fixedly mounted within the casing. A second dial 16 is annular in form and is rotatable dial 16 is retained in position by means of a retaining ring 17 and is provided with gearing 18 around its periphery.

The dial 15 is provided with a scale 19 (FIG. 1) indicating differential pressure. The rotatable dial 16 is provided with a first scale 20 indicating barometric pressure and a second scale 21 indicating cabin altitude. A fixed barometric "bug" or reference mark 22 is carried by the differential pressure dial and is positioned adjacent the barometric pressure scale 20.

In a conventional manner, the altimeter is provided with a front pointer 23 and the differential pressure indicator rear pointer 24 which are operatively connected to movement 25 actuated by diaphragm assemblies, one of which is indicated at 26.

The compensating movement adjustment assembly is indicated generally at 30 and comprises a shaft 31 which is pivotally carried in a flange of the casing 10. The outer end of shaft 31 extends outwardly of the casing and has mounted thereon a compensating or operating knob 32. The inner end of the shaft is positioned within the casing adjacent the outer periphery of the dial 16 and is indicated at 33.

The inner end 33 of the shaft 31 carries a pinion gear 34 which is in mesh with two pinion gears 35 and 36 carried on the ends of yoke assembly retained on the inner end of the shaft. The yoke may comprise front and rear curved arms 38 and 39 having spindles or shafts upon which the gears 35 and 36 are mounted. A spring 40 is carried by the shaft between the yoke and the inner surface of the casing.

Figure 2:
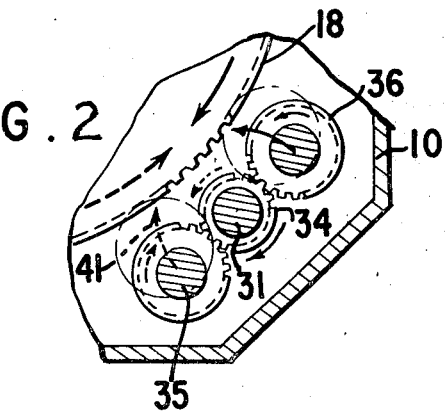
FIG. 2 is an enlarged view of that portion of the compensating knob assembly show in FIG. 1.
Figure 4:
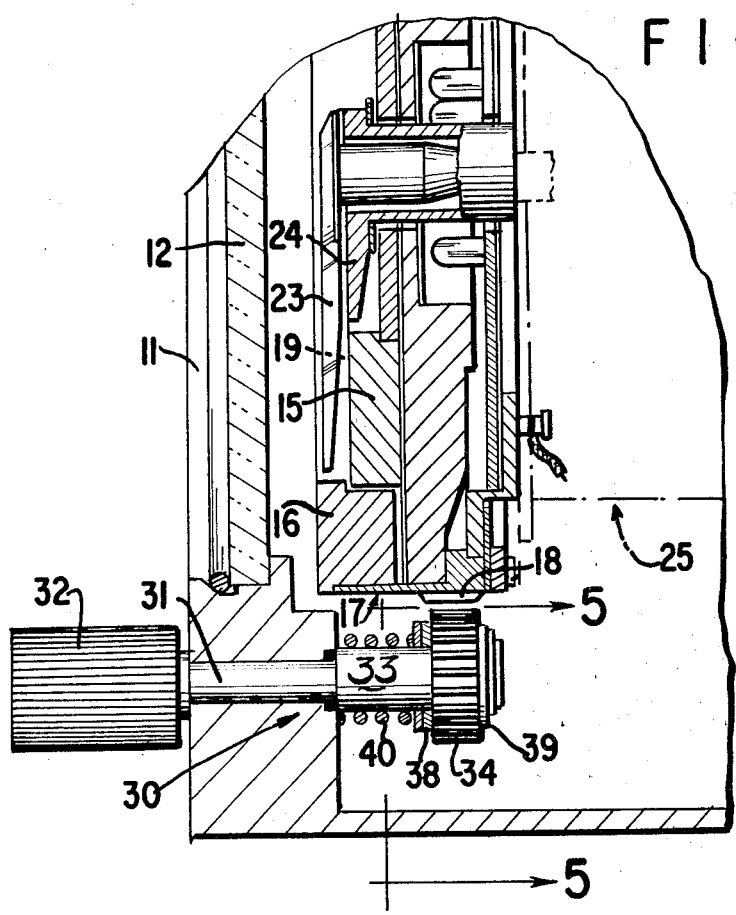
FIG. 4 is a sectional view taken along the line 4—4 of FIG. 2.
Figure 5:
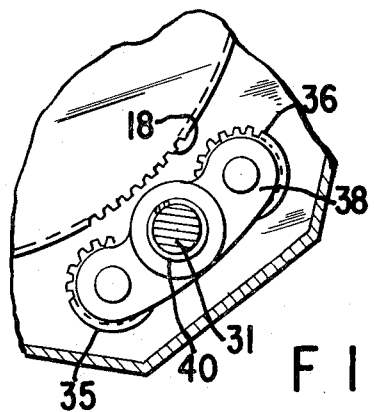
FIG. 5 is a sectional view taken along the line 5—5 of FIG. 4.

When the pilot seeks to adjust the cabin altimeter, he must rotate dial 16 with respect to the reference bug attached to dial 15. This is done by rotating the setting knob 32 in a suitable direction. As may be seen in FIG. 2, when the knob is actuated in a clockwise direction the yoke and, gear 35 mounted on will be pivoted in the direction indicated by the arrow 41 into engagement with the gearing 18 on the outer periphery of the dial 16 causing clockwise rotation of dial 16. Continued rotation of knob and shaft will be transmitted through the gearing 34 and 35 to the dial gearing 18 to rotate this dial with respect to the dial 15. In a similar manner, rotation of the compensating knob in a counter-clockwise direction will cause the gear 36 to mesh with gearing 18 and move the dial in the counter-clockwise direction.

It will be apparent that during any adjustment of the dials, the center line of the compensation shaft 31 will remain fixed with respect to the center of the instrument case and the dials. Driving connection between the compensating knob and the dials thus is achieved merely by a pivoting of the yoke in a suitable direction while the shaft remains fixed with respect to the dials.

In effect, the barometric correction, as described above, zero-shifts the altimeter dial with respect to the altimeter pointer an amount equal to the barometric pressure at the landing site minus the sea lever standard landing site barometric pressure. Generally, the landing tower at the airport is provided with a sensitive altimeter which is set to the airport elevation. By maintaining this elevation setting, adjusted sea lever barometric pressure can be read directly from this instrument. Thus, when the pilot requests a barometric setting, he is given corrected sea level barometric pressure and when this value is set into the cabin altimeter, it is calibrated to conditions at the destination. By rotating the compensating knob, the cabin altitude scale is shifted to compensate for variations in barometric pressure with respect to the barometric pressure scale 20.

Thus, it can be seen that the present invention has provided a simple and reliable compensating knob assembly for barometric altimeters.

It will be understood that various details of construction and arrangement of parts may be made without departing from the spirit of the invention except as defined in the appended claims.

What is claimed is:

1. In an instrument for indicating true altitude, the combination of a fixed reference indicia mounted within a casing, an indicator dial rotatably mounted with respect to said reference indicia having gearing around its periphery, a compensating knob assembly including a rotatable shaft carried in said casing adjacent the peripheral edge of said rotatable dial, a gear mounted on one end of said shaft, and knob means on the other end of said shaft, a yoke mounted on said shaft and rotatable relative thereto, a gear mounted on each end of said yoke meshing with said gear mounted on said shaft and selectively engageable with said rotatable dial gear when said yoke is rotated upon turning of said knob assembly to adjust said rotatable dial with respect to said fixed indicia.

2. In an instrument as claimed in claim 1 wherein the center of said shaft is fixed with respect to the center of the dial.

3. In an instrument as claimed in claim 1 wherein said rotatable dial has two scales thereon indicating respectively barometric pressure and altitude.

4. In an instrument as claimed in claim 1 wherein said shaft extends outwardly of said casing and the compensating knob is mounted on the outer extending portion.

* * * * *

UNITED STATES PATENT OFFICE
CERTIFICATE OF CORRECTION

Patent No. 3,685,360          Dated August 22, 1972

Inventor(s) Jerry L. Raznov

It is certified that error appears in the above-identified patent and that said Letters Patent are hereby corrected as shown below:

Column 1, line 24, after "29.92" insert --inches--. Column 2, line 30, "drawing" should be --drawings--; Column 2, line 31, "Fig." should be --FIG.--; Column 2, line 56, after "is" insert --rotatably mounted about the outer periphery of the dial 15.--; Column 2, line 56, before "rotatable" insert --The--. Column 3, line 25, "on" should be --thereon--; Column 3, line 37, "compensation" should be --compensating--; Column 3, line 46, "lever" should be --level--. Column 4, line 4, "lever" should be --level--.

Signed and sealed this 9th day of January 1973.

(SEAL)
Attest:

EDWARD M. FLETCHER, JR.
Attesting Officer

ROBERT GOTTSCHALK
Commissioner of Patents